ated June 12, 1956

2,750,327

PROCESS OF DYEING ANIMAL FIBERS AND DYES AND DYEING COMPOSITIONS THEREFOR

Wolfgang Max Joseph Eckardt, Bad Segeberg, Holstein, Germany, assignor to Lever Brothers Company, New York, N. Y., a corporation of Maine No Drawing. Application May 28, 1954,
Serial No. 433,269

Claims priority, application Great Britain June 1, 1953

9 Claims. (Cl. 167—88)

This invention relates to novel hair dyes and to hair dyeing compositions containing the same. It further relates to a process for the dyeing of animal fibers using the hair dyeing compositions of the invention.

In my copending application Serial No. 268,125 filed January 24, 1952 there is described a dye for use in a composition for dyeing animal fibers, in particular human hair, and having the general formula $$(NO_2)_m RX_n (NHR^1)_p$$

where R is an aromatic radical, X is an amino or hydroxyl group, R' is an aliphatic radical containing at least one hydroxyl group or one esterified hydroxyl group, $m$ and $p$ are integers each having a value of at least 1 and $n$ is an integer having a value such that $n+p$ is at least 2.

It has now been found that more exact imitations of the natural shades of hair, especially after the hair has turned grey, can be obtained with compositions containing dyes similar to those described above, but with a greater proportion of aliphatic radicals which contain at least one hydroxyl group.

The present invention, therefore, provides a dye for use in a composition for dyeing animal fibers, in particular human hair, and having the general formula $$(NO_2)_m R(NHR^1)_n (NR^2R^3)_p$$

where R is an aromatic radical, $R^1$, $R^2$, $R^3$ are aliphatic radicals containing at least one hydroxyl group and $m$, $n$ and $p$ are integers having a value of at least 1.

Preferably the group R in the above mentioned formula is a benzene radical. A preferred class of compounds are those of the formula

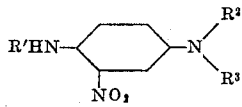

In the above formula $R^1$, $R^2$ and $R^3$ may all be the same groups. They may, however, be all different or any two may be the same and a third a different group. They may be selected from groups such as —CH$_2$CH$_2$OH, —CH$_2$CH$_2$CH$_2$OH, —CH$_2$CHOHCH$_3$,

—CH$_2$CHOHCH$_2$OH

—CH$_2$CH$_2$CH$_2$CH$_2$OH or like groups. Alternatively, either $R^1$, $R^2$ or $R^3$ or all three or any two of these groups may be a polyoxyalkalene group such as polyethylene glycol or polypropylene glycol.

Preferably $R^1$, $R^2$ and $R^3$ are all ethylol (—CH$_2$CH$_2$OH)

groups. However, groups with more than two carbon atoms, for example, those mentioned above and groups with more than one hydroxyl group may be used with advantage.

When used alone without other dyes for dyeing animal fibers the dyes according to the present invention produce deep blue to violet tints. They may be used advantageously in conjunction with other nitro-dyes, for example, the nitro-dyes described in my aforesaid copending application Serial No. 268,125 to produce other shades. They possess the valuable property of suppressing the reddish tints which other nitro-dyes tend to produce, especially when used on grey hair.

Hence, the present invention also provides a composition for dyeing animal fibers, in particular human hair, which composition contains the above-described dyes according to the present invention.

The present invention further provides a process of dyeing animal fibers, in particular human hair, using the above-described composition.

The composition employed for dyeing hair and other animal fibers can be prepared by dissolving or dispersing the dyestuff in water to produce a solution of the desired concentration using, if necessary, a conventional blender or dispersing apparatus. Water-miscible organic solvents such as ethyl alcohol can be employed to facilitate solution; in this event, the dye can be dissolved first in the alcohol, which solution is then diluted with water to the desired concentration.

The dispersion of the dyestuff may also be facilitated by addition of a detergent or dispersing agent. A detergent such as an alkyl sulfate, e. g., lauryl or myristyl sulfate, will also facilitate absorption and retention of the dye by the fiber.

It is desirable but not essential to adjust the pH of the dispersion or solution to 8 or less and preferably in the range from 6.5 to about 7.5. Use of dispersions or solutions having a pH of 8 or less will minimize the effect of the treatment upon the gloss, texture and strength of the fiber.

The material employed to adjust the pH will be an acid or base such as potassium carbonate depending upon the initial pH but it should not attack the hair or other fiber.

Buffer combinations may also be employed in order to maintain the pH of the dispersion of the solution constant during dyeing.

This composition is then applied to the fiber or hair in such a way as to saturate it throughly therewith. This may conveniently be accomplished by immersing the material in the liquid or by combing or brushing out the material and by saturating it with a comb wet with the liquid and by like means known to those skilled in the art.

The intensity and shade of color obtained primarily depend upon the presence or absence of other dyes, the concentration of the liquid and the dyeing temperature. Best results are obtained in the temperature range from 20 to 30° C. and when the dye concentration does not exceed 3%. For most purposes, a concentration in the range from 1 to 2% is preferable but much less than 1% may be adequate under certain circumstances.

It will be appreciated by those skilled in the art that the intensity of shade will also be dependent to some extent upon the dyeing time and upon the nature of the dye. For this reason, specific conditions in every dyeing cannot be given but those skilled in the art will note from the above disclosure and the following examples what conditions to employ in a given case.

The composition and process of the invention are applicable to animal fibers of all types including human hair and wool.

The preparation and use of the dyes according to the present invention will now be illustrated further by the following examples. In these examples all parts are given as parts by weight.

Example 1

7.5 parts of 1-($\beta$-ethylolamine)-4-amino-3-nitrobenzene obtained by heating 1.4-diamino-3-nitrobenzene with excess ethylene chlorhydrin in the presence of anhydrous sodium acetate are ground with 6 parts of magnesium carbonate and mixed with 30 parts of ethylene chlorhydrin. Sulfuric acid is then added to the solution. The undissolved part of the mixture is filtered off and the remaining solution evaporated to a small volume. The sulfate of 1-(di-β-ethylolamino)-4-(β-ethylolamino)-3-nitrobenzene crystallizes out. From this salt the corresponding base may be prepared in the usual way. The pure base melts at 108° C.

When 1 part of a 25% solution of ammonia and 2 parts of wetting agent are added to 1 part of this base mixed with 2 parts of ethanol and the mixture diluted with 94 parts of water, a solution is obtained which when used at 30 to 35° C. for dyeing hair imparts a deep ultramarine shade to the hair.

*Example 2*

1 part of 1-(di-β-ethylolamino)-4-(β-ethylolamino)-3-nitrobenzene, prepared according to Example 1 and 0.1 part of 1:2-di-amino-4-nitrobenzene are mixed with 2 parts of ethanol. 1 part of a 25% solution of ammonia and 1 part of wetting agent are added and the mixture diluted with 97 parts of water. Human grey hair is dyed with this solution at a temperature of 30 to 35° C. when a natural brown shade without any reddish tinge is obtained.

*Example 3*

13 parts of glycidol (epihydrinalcohol) are mixed with 6 parts of 1,4-diamino-3-nitrobenzene. This mixture is kept for 24 hours at —10° C., then for another 24 hours at 20–30° C. The dark-blueviolet colored reaction product, which contains tri-(β,γ-dihydroxypropyl)-1,4-diamino-3-nitrobenzene [i. e. 1-(di-β,γ-dihydroxypropylamino)-4-(β,γ-dihydroxypropylamino) - 3 - nitrobenzene or 1-(β,γ-dihydroxypropylamino) - 4 - (di-β,γ-dihydroxypropylamino)-3-nitrobenzene or a mixture of both], is dissolved in 33 parts of 2 N hydrochloric acid and 2 parts of active carbon are added. After 4 hours the solution is filtered and 62 parts of water, 8 parts of aqua ammonia (25%) and 2 parts of the sodium salt of lauryl alcohol sulfate are added to the filtrate. This dyeing solution when applied to white human hair for 30 minutes at 30° C. dyes the hair with a blueviolet tint. By adding varying amounts of 5-nitro-2,4-diaminotoluene different shades ranging from middle to dark blond may be obtained.

*Example 4*

13 parts of glycidol (epihydrinalcohol) are mixed with 8 parts of 1-(β-ethylolamino)-4-amino-3-nitrobenzene (obtained as described in Example 1). This mixture is kept at —10° C. for 2 days and then for another 2 days at room temperature. The blueviolet reaction product which contains 1,4-diamino-3-nitrobenzene in which three hydrogen atoms of the amino groups are substituted by one hydroxyethyl and two dihydroxypropyl groups is mixed with 160 parts of water and 8 parts of aqua ammonia (25%). 2 parts of a wetting agent are added together with 0.5–0.7 part of 5-nitro-2,4-diaminotoluene according to the desired shade. The so-obtained dyeing solution dyes white hair at 30–40° C. in about 30 minutes to a light brown color.

*Example 5*

20 parts of 3-chloro-propanol-1 are mixed with 2 parts of 1,4-diamino-3-nitrobenzene, 8 parts of anhydrous potassium-carbonate and 0.04 part of iodine and heated for 6 hours in an oil bath at a temperature of 130° C. After keeping for 1 day at room temperature the mixture is heated again in an oil bath for 9 hours. The precipitated KCl is filtered off and after washing with a mixture of ethanol and isopropanol the mixture is concentrated by evaporation. This solution contains tri-(γ-hydroxypropyl)-1,4-diamino-3-nitrobenzene. To this solution 70 parts of water, 1 part of ammonium lauryl sulfate and 4 parts of aqua ammonia (25%) are added and to the solution is added water until 100 parts by weight are obtained. Then 0.16 part of 5-nitro-2,4-diamino toluene are added and the mixture is heated for half an hour at 60–70° C. A hair dye solution is obtained which dyes grizzled hair at 35–40° C. to a middle blond shade.

I claim:

1. A process of dyeing animal fibers, in particular human hair, which comprises treating hair with an aqueous solution of at least one organic dye of the general formula:

where R is a benzene ring, $R^1$, $R^2$ and $R^3$ are aliphatic radicals of 1–4 carbon atoms, inclusive, each containing at least one hydroxyl group and $m$, $n$ and $p$ are integers having a value of at least 1.

2. A process according to claim 1, in which the dye has the formula

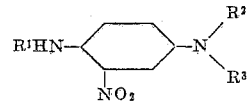

in which $R^1$, $R^2$ and $R^3$ are aliphatic radicals of 1–4 carbon atoms, inclusive, each containing at least one hydroxyl group.

3. A process according to claim 1 in which R is a benzene ring, $R^1$, $R^2$, and $R^3$ are ethylol groups and $m$, $n$ and $p$ are 1.

4. A compound for use in dyeing animal fibers, in particular human hair, having the general formula:

where R is a benzene ring, $R^1$, $R^2$ and $R^3$ are aliphatic radicals of 1–4 carbon atoms, inclusive, each containing at least one hydroxyl group and $m$, $n$ and $p$ are integers having a value of at least 1.

5. A compound having the formula:

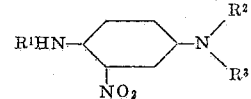

in which $R^1$, $R^2$ and $R^3$ are aliphatic radicals of 1–4 carbon atoms, inclusive, each containing at least one hydroxyl group.

6. A compound according to claim 4 in which R is a benzene ring, $R^1$, $R^2$ and $R^3$ are ethylol groups and $m$, $n$ and $p$ are 1.

7. A composition for dyeing animal fibers, in particular human hair, comprising an aqueous solution of the compound of claim 4.

8. A composition for dyeing animal fibers, in particular human hair, comprising an aqueous solution of the compound of claim 5.

9. A composition for dyeing animal fibers, in particular human hair, comprising an aqueous solution of the compound of claim 6.

References Cited in the file of this patent

UNITED STATES PATENTS

| Number | Name | Date |
|---|---|---|
| 1,854,460 | Dreyfus | Apr. 19, 1932 |
| 1,932,901 | Lehmann | Oct. 31, 1933 |
| 2,019,626 | Olpin et al. | Nov. 5, 1935 |
| 2,022,245 | Lehmann | Nov. 26, 1935 |
| 2,202,902 | Ellis | June 4, 1940 |